May 17, 1932. J. G. STEELE 1,858,973
VEHICLE BRAKE
Filed Feb. 24, 1928 2 Sheets-Sheet 2
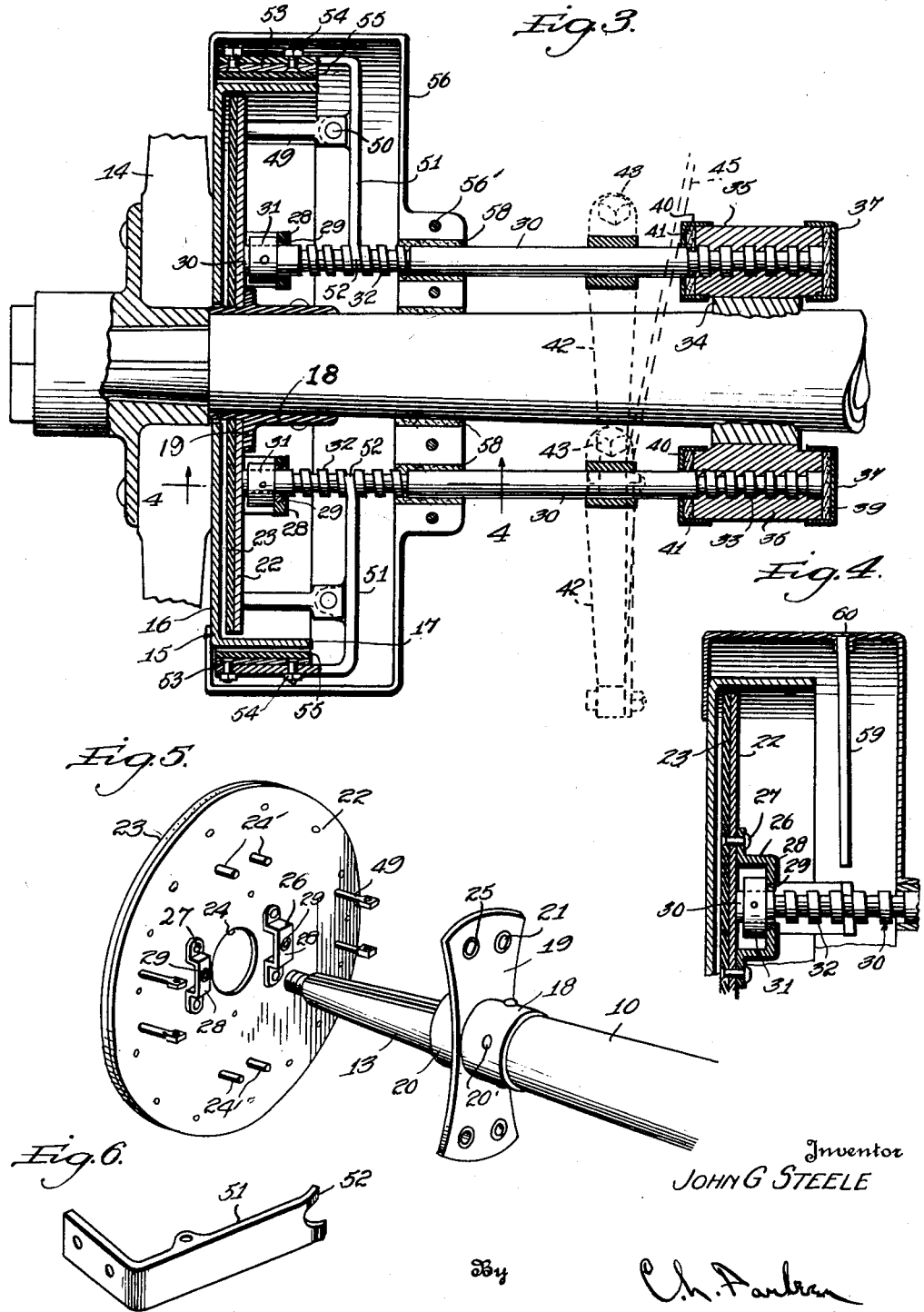
Inventor
JOHN G STEELE
By
C. H. Fanlun
Attorney Patented May 17, 1932

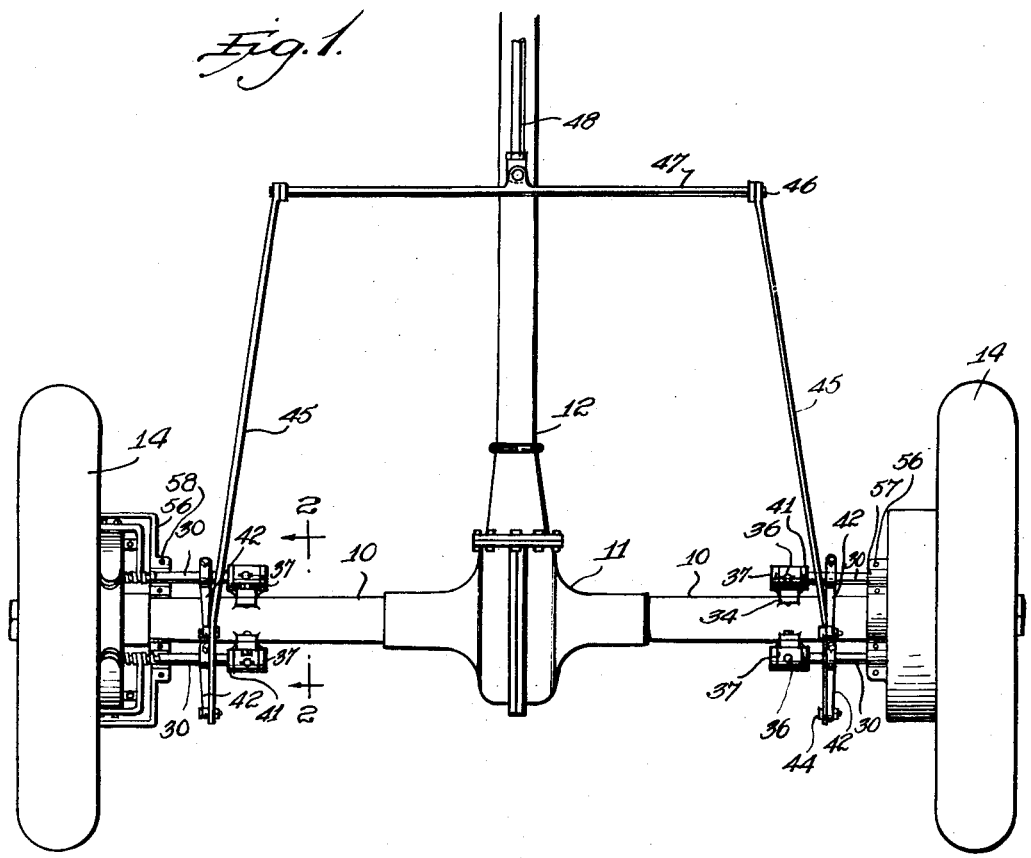
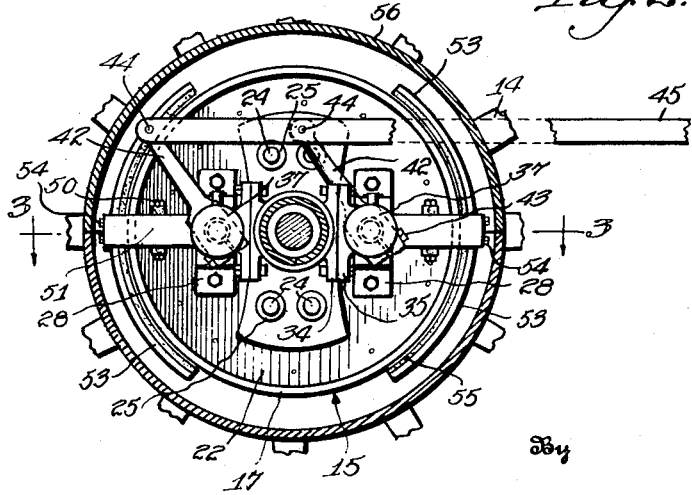

1,858,973

UNITED STATES PATENT OFFICE

JOHN G. STEELE, OF LATROBE, PENNSYLVANIA

VEHICLE BRAKE

Application filed February 24, 1928. Serial No. 256,688.

This invention relates to vehicle brakes.

An important object of the invention is to provide novel braking means whereby the application and releasing of the brakes takes place positively, as distinguished from the usual brake constructions wherein expanding or contracting means for external or internal brakes is provided for permitting th; brakes to be released.
A further object is to provide multiple braking means for each rear wheel, or for all four wheels of the vehicle, each multiple braking means being operable by common actuating means.
A further object is to provide a device of the above mentioned character wherein the braking action takes place both radially and longitudinally with respect to the axle.

A further object is to provide common means for actuating the radial and longitudinal brake applying means.

A further object is to provide one or more shafts movable longitudinally to directly apply a braking force to a vehicle wheel, and to provide other braking means indirectly operable from the movable shaft or shafts.

Other objects and advantages of the invention will become apparent during the course of the following description.
In the drawings I have shown one embodiment of the invention. In this showing, Figure 1 is a plan view of the rear portion of the running gear of the vehicle showing the invention applied, Figure 2 is a section on line 2—2 of Figure 1, the housing being shown in section, Figure 3 is an enlarged section on line 3—3 of Figure 2, Figure 4 is a fragmentary section on line 4—4 of Figure 3, Figure 5 is a perspective view of the backing plate, axle housing and associated elements, Figure 6 is a detail perspective of one of the movable brake operating members, and, Figure 7 is a detail perspective view of a bearing cap.

Referring to the drawings, the numeral 10 designates the axle housings for the rear of a vehicle connected at their inner ends to a differential housing 11. This housing contains the usual differential gearing adapted to be driven by a propeller shaft (not shown) arranged in a shaft housing 12 connected at its rear end in the usual manner to the differential housing. The usual axles 13 are arranged in the housings 10 and are provided at their outer ends with wheels 14 of the ordinary type.

The device forming the subject matter of the present invention comprises a brake drum 15 having a disk portion 16 and an annular flange 17, as clearly shown in Figure 3. The brake drum is carried by one of the wheels in the usual manner. In the present instance, the apparatus is shown applied only to the rear wheels of the vehicle, but it will be apparent that it is not limited to such application.

Each end of the axle housing is provided with a collar 18 carrying a preferably integral backing plate 19. This plate extends above and below the collar 18, and the latter extends outwardly beyond the plate 19, as at 20, for a purpose to be described. The upper and lower end portions of the plate 19 are provided with guide openings 21. The collars 18 my be secured to the axle housing in any suitable manner such as by welding or by rivets 20' as shown in Figure 5.

A brake disk 22 is arranged adjacent each end of the axle housing and is provided with a brake facing 23 preferably formed of leather or the like. The disk and brake facing are provided with a central opening 24 slidably receiving the projecting end 20 of the collar 18. In order to fix the disk 22 against rotation, it is provided at upper and lower portions of its inner face with inwardly projecting relatively heavy pins 24' adapted to slide in the guide openings 21. For the purpose of preventing rattling in the operation of the device, the openings 21 are preferably provided with hard wood bushings 25. From the construction described, it will be apparent that the disk 22 is adapted to move inwardly and outwardly with respect to the backing plate, but is prevented from turning with respect to the axle. The disk 22 is movable outwardly in a manner to be described to bring the brake facing 23 into engagement with the inner face of the disk portion of each brake drum. Clips 26 are secured against the inner face of each disk 22 by rivets or the like 27, the inner portions 28 of the clips being spaced from the brake disk as shown in Figure 4. The central portions 28 of the clips are provided with openings receiving hard wood bushings 29 for the same purpose as the bushings 25 previously described. A shaft 30 is rotatably mounted at its outer end in each of the bushings 29 and is provided between the clip 26 and the adjacent brake disk with a collar 31. These collars are adapted to engage the clips 28 to withdraw the brake facing 23 from engagement with its associated drum upon inward movement of the shafts 30, in a manner to be described. Outward movement of the disks 22 to apply the brakes is accomplished by outward movement of the shafts 30, the outer ends of these elements projecting beyond the collars 31 to contact with the disks 22, as shown in Figure 4.

Each shaft 30 is provided with a pair of relatively heavy threaded portions 32 and 33, the former lying adjacent the clips 28 while the latter are formed at the inner ends of the shafts, as shown in Figure 3. Referring to Figures 1 and 2, it will be noted that each axle housing 10 is provided on opposite sides thereof with integral brackets 34 to which bearings 35 are bolted or otherwise secured. The bearings 35 are internally threaded to receive the threads 33, and it will be apparent that oscillation of the shafts 30 is adapted to cause these elements to move longitudinally. It is this longitudinal movement which applies and releases the brake elements 23 in the manner previously described. Each bearing 35 is preferably provided with a lubricant cup 36 of any desired type. As shown in Figures 3 and 7, a cap 37 may be provided for covering the inner end of each bearing 35, and this cap may be provided with bayonet slots 38 adapted to receive suitable pins (not shown) carried by the bearings 35. Each cap may be provided with an inner disk 39 formed of felt or other suitable material to retain lubricant in the bearings 35. A similar cap 40 is adapted to cover the inner end of each bearing 35 and is provided with a similar felt washer 41, the cap 40 and washer 41 being provided with an opening through which the associated shaft 30 extends.

As shown in Figures 1, 2 and 3, the shafts 30 are arranged in pairs on opposite sides of the end portions of the axle housings, and means are provided for simultaneously operating these shafts. An arm 42 is connected to each shaft 30. These arms may be split at their ends as shown in Figure 2, and may be clamped about the shafts 30 by nuts or the like 43. The free ends of the arms 42 associated with each pair of shafts 30 are pivotally connected as at 44 with one end portion of a brake operating rod 45. The forward end of each rod 45 is pivotally connected as at 46 to one end of an equalizer 47, the latter in turn being pivotally connected to the rear end of a brake pull rod 48. The forward end of the rod 48 is connected to the usual brake pedal, and the brake pedal, or one of the elements connected thereto is preferably provided with a single spring adapted to retain the pedal and associated elements in normal or inoperative position.

Referring to Figures 3, 5 and 6, the numeral 49 designates a pair of studs carried by the forward and rear portion of each disk 22, outwardly of the clips 26. The studs 49 of each pair receive a pivot pin 50 passing through their free ends. A brake operating lever 51 is pivotally supported by each pin 50 and is provided at its inner end with a pair of oppositely bent projections 52 adapted to engage the threads 32 of one of the shafts 30. It will be apparent that oscillation of the shafts 30 is adapted to swing the free ends of the levers 51. In connection with this matter, attention is invited to the fact that the longitudinal movement of the shaft 30 and the relation between the threads 32 and levers 51 is such that the longitudinal movement of the shafts 30 does not counteract the action of the threads 32 in turning the members 51 about their pivots. The outer ends of the levers 51 are provided with arcuate brake shoes 53 secured thereto by rivets, bolts or the like 54. Each shoe 53 is provided with a brake lining 55 which may be formed of leather or any other suitable material. It will be apparent that inward swinging movement of the inner ends of the levers 51 is adapted to bring the brake linings 55 into engagement with the flange portions of the brake drums.

If desired, a suitable casing 56 may be provided for the brake drum and elements associated therewith. This casing is preferably formed of a pair of complementary sections which may be secured together by bolts or the like 56', the inner portions of the casing being provided with circular portions 57, (see Figure 1,) through which the shafts 30 extend. These circular portions of the casing are preferably provided with felt or similar linings 58 to prevent dust and foreign matter from entering the casing, and to prevent the leakage of oil therefrom. As shown in Figure 4, the casing of each brake may be provided with an oil tube 59 arranged over each shaft 30, the upper end of each oil tube being closed by a cap 60.

The operation of the device is as follows:
When it is desired to apply the brakes, the brake pedal is depressed, thus pulling the rod 48 forwardly. Through the equalizer 47, this movement is transmitted to the brake rods 45, and thence to the arms 42. The arms obviously will simultaneously rock the shafts 30, and their threaded connection with the bearings 35 causes them to move outwardly. Under such conditions, the outer ends of the shafts 30 engage the inner faces of the plates 22 to move these elements outwardly and consequently bring the brake facings 23 into engagement with the disk portions of the drums. The outer ends of the shafts 30 are supported for rotation by the clips 26, while the shafts are prevented from rattling in these clips by the wood bushings 29. The rocking of the shafts 30 also transmits movement to the levers 51, thus swinging the outer ends of these elements inwardly to bring the brake members 55 into engagement with the flanges of the brake drums. The application of all of the brake elements of each wheel takes place simultaneously, as will be obvious. The movement is transmitted positively to the brake elements, and no adjustment thereof is necessary.

When it is desired to release the brakes it merely is necessary to release the operating pedal and the spring thereof returns the pedal to normal position. This action pushes the brake rods 45 rearwardly through their connections with the brake pedal, and obviously the arms 42 also will be swung rearwardly to return the shafts to normal position. The rearward swinging of the arms 42 rocks the shaft 30, and the threads 33 and their connection with the bearings 35 causes the shafts to be moved inwardly whereby the collars 31 engage the clips 26 to withdraw the brake elements 23 from engagement with the brake drum. Simultaneously, movement is transmitted to the levers 51 to swing the brake shoes 53 outwardly, and thus release the brake elements 55 from the flanges of the drums. It will be apparent that the same positive action is provided in releasing the brakes as in applying them, and thus dragging of the brakes is wholly eliminated. It also will be apparent that the present invention contemplates the operation of a double set of brakes operated simultaneously upon a single application of power. The shafts 30 act directly upon one set of brake elements while they indirectly and simultaneously cause the application of the other set of brake elements.

Owing to the increased braking obtained, very little force is necessary to operate the brakes, and the distribution of the braking prevents the brakes from chattering. It also will be apparent that the relining of the brakes may be easily and cheaply accomplished.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:—

1. In a brake construction, a rotatable element, two movable brake members adapted to be brought into engagement with said element, an actuating member directly connected to one of said brake members, and connections between said actuating member and the other brake member for operating the latter simultaneously with the operation of said first mentioned brake member.

2. In a brake construction, a rotatable brake drum including a disk portion and a cylindrical flange, a brake member movable parallel to the axis of said drum and adapted to engage the disk portion thereof, means for preventing rotation of said brake member, a second brake member movable at an angle to the axis of said drum and adapted to engage the cylindrical flange thereof, actuating means directly connected to one of said brake members, and operating connections between said actuating means and the other brake member.

3. In a brake construction, a rotatable brake drum including a disk portion and a cylindrical flange, a brake member movable parallel to the axis of said drum and adapted to engage the disk portion thereof, a second brake member movable at an angle to the axis of said drum and adapted to engage the cylindrical flange thereof, a movable member directly connected to said first named brake member, and connections between said movable member and the other of said brake members, said movable member being operable to simultaneously move said brake members to operative position.

4. In a brake construction, a rotatable brake drum including a disk portion and a cylindrical flange, a brake member movable parallel to the axis of said drum and adapted to engage the disk portion thereof, a second brake member movable at an angle to the axis of said drum and adapted to engage the cylindrical flange thereof, a member directly connected to said first named brake member and movable to actuate the latter, and a lever connected at one end to the other brake member and at its opposite end to said movable member to be actuated thereby to operate said second brake member simultaneously with the operation of said first brake member.

5. In a brake construction, a rotatable brake drum including a disk portion and a cylindrical flange, a brake member movable parallel to the axis of said drum and adapted to engage the disk portion thereof, a second brake member movable at an angle to the axis of said drum and adapted to engage the cylindrical flange thereof, a rock shaft mounted parallel to the axis of said drum and connected at one end to said first named brake member, means for effecting longitudinal movement of said shaft as it is rocked about its axis, and means connected between said shaft and the other brake member to actuate the latter upon longitudinal movement of said shaft.

6. In a brake construction, a rotatable brake drum including a disk portion and a cylindrical flange, a brake member movable parallel to the axis of said drum and adapted to engage the disk portion thereof, a second brake member movable at an angle to the axis of said drum and adapted to engage the cylindrical flange thereof, a shaft arranged parallel to the axis of said drum, means for supporting said shaft whereby the latter is adapted to partake of longitudinal movement, one end of said shaft being directly connected to said first named plate member, and operating connections between said shaft and the other brake member.

7. A device constructed in accordance with claim 6 provided with a stationary backing plate, and means for connecting said backing plate to said first named brake element whereby the latter is adapted to move toward and away from the disk portion of said drum but is prevented from rotating with respect thereto.

8. A device constructed in accordance with claim 6 wherein said shaft is provided with a threaded portion whereby the rocking movement of said shaft is adapted to effect longitudinal movement thereof.

9. A device constructed in accordance with claim 6 wherein said shaft is provided with a threaded portion whereby rocking movement of said shaft is adapted to effect longitudinal movement thereof, the operating connections between said shaft and the second mentioned brake member comprising a lever pivotally supported intermediate its ends and connected at one end to said second mentioned brake member, said shaft being provided with a second threaded portion adapted to engage the opposite end of said lever.

10. In a brake construction, a rotatable brake drum including a disk portion and a cylindrical flange, a brake plate having a brake facing adapted to engage the disk portion of said drum upon longitudinal movement of said plate in one direction with respect to the axis of said drum, a pair of shafts mounted on opposite sides of the axis of said drum and each connected at one end to said plate, an internally threaded bearing for supporting the other ends of said shafts, said shafts being provided with threads engaging the threads in said bearings, parallel arms connected at one end to said shafts, a pull rod connected to the other end of each arm, a pair of oppositely arranged brake shoes movable inwardly toward each other to engage the flange of said drum, a pair of levers pivotally supported intermediate their ends and each connected at one end to one of said brake shoes, and means for transmitting longitudinal movement of said shafts to the opposite ends of said levers.

11. A device constructed in accordance with claim 10 wherein said means comprises a threaded portion on each of said shafts, and a fork carried by the last named end of each lever and adapted to engage said last named threaded portion.

12. A device constructed in accordance with claim 10 provided with a stationary backing plate having a plurality of openings therein, and pins carried by said brake plate parallel to the axis of said drum and slidable in said openings.

13. In a brake construction, a rotatable brake drum including a disk portion and a cylindrical flange, a brake member movable parallel to the axis of said drum to engage the disk portion thereof, means for preventing rotation of said brake member, operating members for said brake member connected thereto and arranged on opposite sides of the axis thereof, a common actuating member for said operating members, a second brake member movable at an angle to the axis of said drum to engage the cylindrical flange thereof, and diametrically opposite operating elements connected to said second brake member at diametrically opposite points and each connected to one of said operating members to be actuated thereby.

14. In a brake construction, a rotatable brake drum including a disk portion and a cylindrical flange, a brake member movable parallel to the axis of said drum to engage the disk portion thereof, operating members for said brake member directly connected thereto and arranged on opposite sides of the axis thereof, said operating members being adapted upon rotation thereof to effect movement of said brake member, a common actuating member for said operating members, a radially contractible and expansible brake member adapted to engage the cylindrical flange of said brake drum, and operating levers connected at their outer ends to said second brake member at diametrically opposite points and at their inner ends to said operating members to be actuated upon rotation thereof.

In testimony whereof I affix my signature.

JOHN G. STEELE.